United States Patent [19]

Dickey

[11] Patent Number: 4,761,236

[45] Date of Patent: Aug. 2, 1988

[54] COORDINATED SORPTIVE STRAND CONTACTOR

[76] Inventor: Leland C. Dickey, 914 Hickory Dr., Blue Bell, Pa. 19422

[21] Appl. No.: 71,429

[22] Filed: Jul. 9, 1987

[51] Int. Cl.$^4$ .................... B01D 15/08; B01D 15/02
[52] U.S. Cl. .................... 210/635; 210/656; 210/676; 210/190; 210/198.2; 210/400
[58] Field of Search .............. 210/635, 656, 659, 676, 210/190, 198.2, 386, 400, 401

[56] References Cited

U.S. PATENT DOCUMENTS

| | | | |
|---|---|---|---|
| 2,222,828 | 11/1940 | Guthrie | 183/4 |
| 2,389,378 | 11/1945 | Marisic | 196/52 |
| 2,639,000 | 5/1953 | Edwards | 183/4.6 |
| 2,866,827 | 12/1958 | Jurgeleit | 210/676 |
| 3,236,768 | 2/1966 | Litt | 210/23 |
| 3,335,081 | 8/1967 | El-Naggar | 210/15 |
| 3,436,213 | 4/1969 | Norris | 210/676 |
| 3,498,026 | 3/1970 | Messinger | 55/73 |
| 3,757,492 | 9/1973 | Graff | 55/181 |
| 3,962,069 | 6/1976 | Inoue et al. | 204/300 |
| 4,101,400 | 7/1978 | Pepping | 204/180 |
| 4,242,107 | 12/1980 | Jenkins | 55/18 |
| 4,292,054 | 9/1981 | Noack et al. | 55/181 |
| 4,351,650 | 9/1982 | Shinoda et al. | 55/181 |
| 4,353,720 | 10/1982 | Margraf | 55/262 |
| 4,548,802 | 10/1985 | Dickey | 423/659 |
| 4,548,803 | 10/1985 | Dickey | 423/659 |
| 4,599,225 | 7/1986 | Dickey | 423/659 |

FOREIGN PATENT DOCUMENTS

| | | | |
|---|---|---|---|
| 3102280 | 1/1981 | Fed. Rep. of Germany | 55/77 |
| 79024 | 12/1978 | Japan | 55/354 |
| 1339621 | 5/1971 | United Kingdom | 55/386 |

Primary Examiner—Ernest G. Therkorn
Attorney, Agent, or Firm—Zarley, McKee, Thomte, Voorhees & Sease

[57] ABSTRACT

This invention relates to a sorptive contactor and more particularly to the process for separating, reacting or adding components of a fluid mixture. The process involves providing at least one sorption zone and at least one desorption zone. The adjacent ends of the sorption and desorption zones have aligned apertures through which strands of sorbent material may be passed. The space between the sorption and desorption zones is enclosed in an air lock. The separated strands will pass directly from the sorption zone to the desorption zone through the air lock, passing through the apertures without touching either housing. The surface tension of the liquid in the apertures and the slight overpressure in the air lock maintains the liquid in the sorption and desorption zones. The strands are maintained separate from one another throughout an endless loop so as to reduce the amount of friction on the strands. Each of the sorption and desorption zones has an open portion in its top through which the strands exit and/or enter, thereby eliminating the necessity of a mechanical seal of any type.

17 Claims, 1 Drawing Sheet

U.S. Patent  Aug. 2, 1988  4,761,236
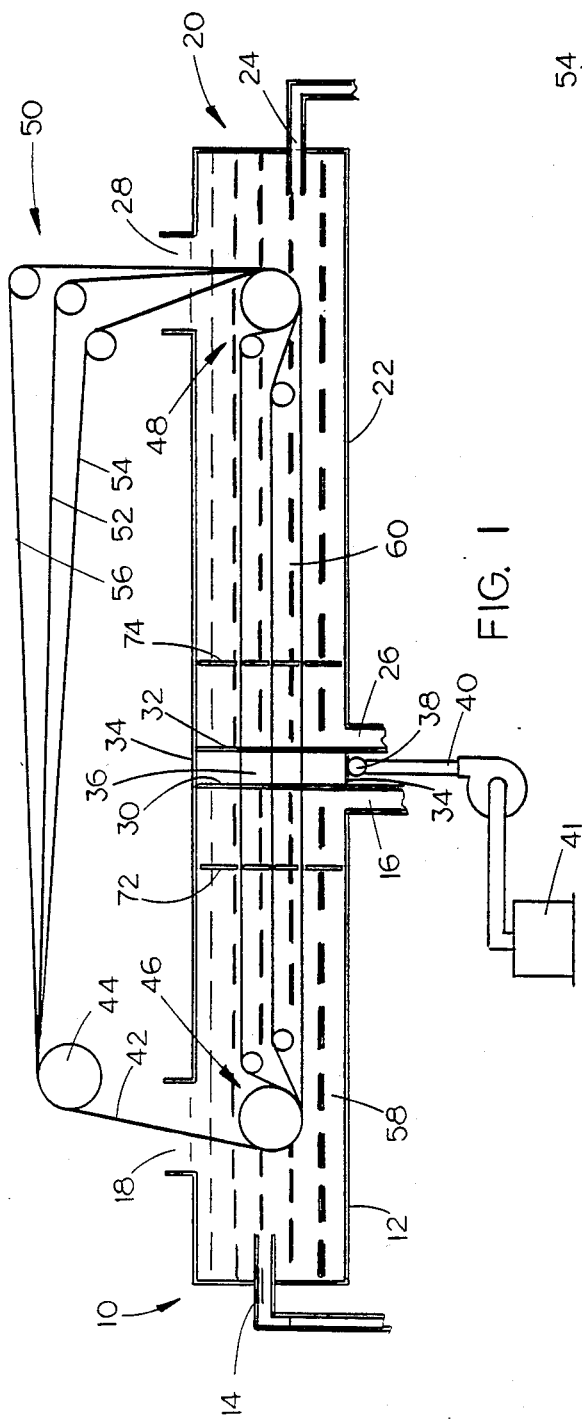
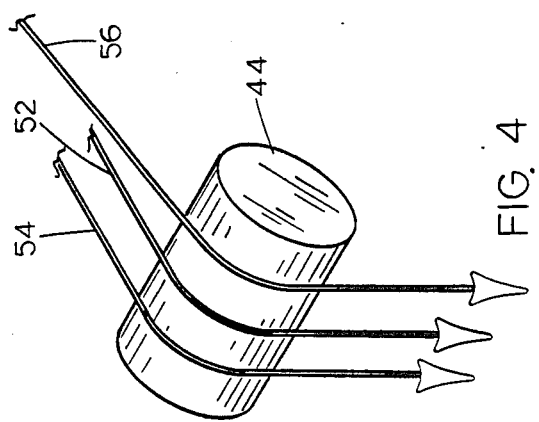
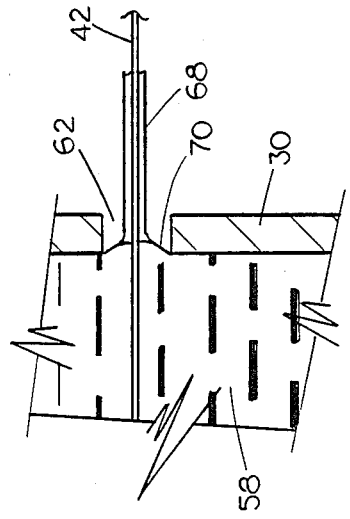
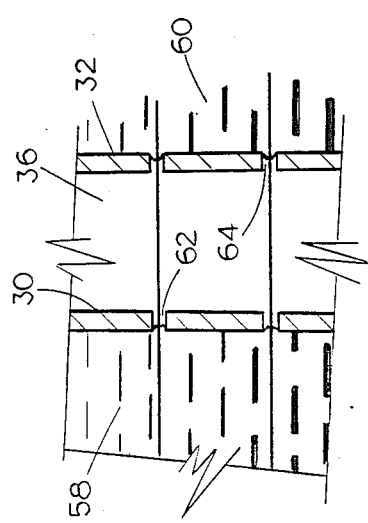

COORDINATED SORPTIVE STRAND CONTACTOR

TECHNICAL FIELD

This invention relates generally to a sorptive contactor, and more particularly to a sorptive contactor having an air lock separating sorption and desorption zones.

BACKGROUND OF THE INVENTION

Methods utilizing adsorption to separate fluid mixtures are used commercially, for example, on fixed beds of granulated activated carbon or zeolite. It is believed that a majority of the prior art methods suffer from the drawback of being either a cyclic or batch process, in which the sorbent charge is depleted and must be replaced or regenerated after some use. For systems requiring continuous separation, a spare bed must be available for use during regeneration, which often means a duplicate bed and nearly a doubling of capital cost for the separation.

One attempt to solve the problem of fixed beds is to utilize a continuous process such as the Dow Traveling Ion Exchange Bed or a rotating annular chromatograph as described in 30(5) AIChE J 705 (1984). Inherent in any continuous sorptive separation process is the use of a mechanism for moving the sorbent between the sorbing and desorbing (sorbent regeneration) zones. This aspect of sorptive separation was described in U.S. Pat. Nos. 4,548,802 and 4,548,803 which were entitled "Continuous Flow Separation with Moving Boundary Sorption". Math modeling studies of the processes described in these patents reveal it to be approximately competitive with the current fixed bed processes. The modeling indicated that increased separation effectiveness would be achieved to the extent that boundary sorptive surface increased per separator volume.

An effort to achieve greater sorptive surface than possible under the constraints of the moving boundary concept described in said patents led to the new and more comprehensive process described in the applicant's application entitled "Sorptive Contactor", Ser. No. 918,271, now abandoned. The process of that invention abandons the use of sorbent boundary-forming elements.

Standard sorbent materials have vast surface area per unit mass with smallest pore sizes in the nanometer range. This means that the sorbent atoms or molecules can attach sorbate molecules on almost a one-to-one basis. The drawback to use of these materials is that nearly all (99.999% or more depending upon the particle size) of the sorbent surface (sites) are internal. Time is required for the sorbate to get to these sites through the necessarily restrictive pores; desorption is similarly retarded so that removal of large or bulky molecules is not practical. As a consequence, sorptive beds are sized on the basis of providing enough holdup for the sorbate to diffuse to empty internal sites before leaving the bed. This results in relatively large beds or low flow rate compared to the case of equivalent external sorptive surface.

Since an external surface could be quickly saturated, it is practically mandatory that it be regenerated on a high frequency basis to take advantage of its accessibility advantage over porous sorbents; continuous regeneration is optional, allowing the minimum sorber size for a given application.

It is recognized that a means of preparing a mixture of solution of prescribed concentration, such a pharmaceutical preparation, could be effected by the sorptive process. Likewise, contacting fluid (say in the desorption zone) with a permanent catalyst-sorbent, or with reactant carried from the sorption zone—as a sorbate—could provide a means of controlling the rate of a chemical reaction, by controlling the sorbent velocity. Consequently, the sorptive contactor could with appropriate modification be used for any process in which change results from continuous sorptive treatment of a fluid by a solid.

The invention of the copending application is a design for a sorbent system wherein the surface is at or near the geometric (cylindrical) surface of strands which move more or less uniformly in the fluid to minimize transport resistance through the fluid. The sorptive contactor of the copending application disclosed a means of using a moving, multiple strand adsorber to contact fluids in a sequence of zones, the fluid in which could be kept separate and at different conditions of temperature or other environmental parameter. A related device is demonstrated in West German patent No. 3102-280.

In these earlier inventions, a bundle of adsorptive strands are passed through a conventional seal, are separated and drawn through a guide which assures total separation of each of the strands as the strands pass through a sorption vessel. The strands are then gathered into a tight bundle at the other end of the vessel before passing through another seal as it leaves the vessel. The gathering and spreading guides are mechanically cumbersome and can lead to undesirable abrasion of the sorbent surface. Thus, it can be seen that the strands coated with sorbate in the sorption zone are tightened into a bundle, passed through a mechanical seal to leave the sorption vessel, passed through an additional mechanical seal to enter the desorption vessel, and then passed through a spreading guide before the strands contact the desired fluid in the desorption vessel.

The surface of the strands of the sorptive contactor is coated with a sorbate layer, which may be very thin, possibly only one molecule of sorbed material at each surface site. A difference in strand velocity between each of the multiple strands would likely have enough frictional force to disturb the adsorbate or the sorbing surface. Currently available treatments to polymeric surfaces to make them selectively sorptive to biological molecules are relatively expensive and the treated surface fragile. This fragility is compatible with stationary gel type separation methods but not of methods where solid shearing or slip occurs at the treated surface, as can occur in the sorptive contactors which bundle strands together as they pass between the sorption and desorption zones.

It is therefore a principal object of the present invention to provide an improved coordinated sorptive strand contactor.

A further object of the invention is to provide a sorptive contactor which reduces the abrasion of the contactor strands between the sorption zone and desorption zones.

Yet another object is to provide a sorptive contactor which achieves great, external and readily accessible surface in the sorption and desorption zones.

Still another object of the present invention is to provide a sorptive contactor wherein a series of separated strands are exposed to liquid mixtures in the sorption and desorption zones.

Yet another object is to provide a sorptive contactor having separated strands formed of a single spiral endless loop of sorbent material.

Yet a further object of the present invention is to provide a sorptive contactor with separated strands which pass from the sorption zone to the desorption zone without abrasion.

These and other objects will be apparent to those skilled in the art.

SUMMARY OF THE INVENTION

This invention relates to a sorptive contactor and more particularly to the process for separating, reacting or adding components of a fluid mixture. The process involves providing at least one sorption zone and at least one desorption zone. The adjacent ends of the sorption and desorption zones have aligned apertures through which strands of sorbent material may be passed. The space between the sorption and desorption zones is enclosed in an air lock and may be pressurized such that liquid in the sorption and desorption zones will not enter the air lock. The separated strands will pass directly from the sorption zone to the desorption zone through the air lock, passing through the apertures without touching either housing. The surface tension of the liquid in the apertures and the slight overpressure in the air lock maintains the liquid in the sorption and desorption zones. The strands are maintained separate from one another throughout an endless loop so as to reduce the amount of friction on the strands. Each of the sorption and desorption zones has an open portion in its top through which the strands exit and/or enter, thereby eliminating the necessity of a mechanical seal of any type.

BRIEF DESCRIPTION OF THE DRAWINGS

FIG. 1 is a sectional schematic view of the separator;

FIG. 2 is an enlarged view of the air lock portion of the separator;

FIG. 3 is a super-enlarged view of one portion of the air lock;

FIG. 4 is a perspective view of the drive pulley of the invention.

DESCRIPTION OF THE PREFERRED EMBODIMENT AND PROCESS

Referring now to the drawings, in which the numerals refer to similar or corresponding parts throughout the drawings, and more particularly to FIG. 1, the numeral 10 refers to a sorption zone defined by housing 12 having a fluid inlet 14 and a fluid outlet 16. Housing 12 further includes an open port 18 in its upper end. The numeral 20 refers to a desorption zone defined by housing 22 having a fluid inlet 24 and a fluid outlet 26. Housing 22 also includes a port 28 in its upper end.

Sorption zone housing 12 and desorption zone housing 22 each have an apertured end plate 30 and 32 respectively, and are positioned with end plates 30 and 32 adjacent one another and spaced apart. The space between sorption zone 10 and desorption zone 20 is enclosed by walls 34 so as to form an air lock 36. A valve 38 in one wall of air lock 36 will allow gas to enter or be discharged therefrom. A conduit 40 connected to valve 38 leads to a source of gas 41, thereby enabling air lock 36 to be pressurized using air or other gases. A plurality of elongated strands 42 successively pass through port 18, sorption zone 10, airlock 36, desorption zone 20, and port 28, in endless loops. A suitable means is provided for driving or pulling the strands 42 through the sorption and desorption zones such as drive pulley 44 and sets of idler pulleys 46, 48, and 50. Drive pulley 44 and idler pulley sets 46, 48 and 50 are comprised of soft rollers so as to eliminate any sliding friction as strands 42 pass around them.

The strands 42 are preferably comprised of a single elongated sorptive strand formed into multiple loops 52, 54, and 56 which are essentially parallel through the majority of their length, and converge at a gathering point on drive pulley 44. While it would also be possible to utilize completely separate strands for loops 52, 54, and 56, for convenience of construction and adjustment the use of the single-strand multiple-loop spiral is preferred. FIG. 4 demonstrates one arrangement of loops 52, 54, and 56 on drive pulley 44, so as to utilize a single strand spiral loop.

Sorption zone 10 is filled with a liquid fluid mixture 58 having a component or components to be sorbed, while desorption zone 20 contains a liquid fluid mixture 60 which desorbs the sorbed component from strands 42. The interface between fluids 58 and 60 and the atmosphere at ports 18 and 28 is simply the upper fluid surface, the fluid being kept in its respective zone by gravity. It can be seen that strands 42 exit the desorption zone in a generally vertical orientation, such that excess fluid 60 will be generally retained within desorption zone 20. It may be advantageous to vibrate strands 42 gently at the point of exit from port 28 in order to minimize fluid carry-over to the next zone.

As was discussed in the background of the invention, friction against strands 42 can cause disturbance of the adsorbate or the sorbing surface. The most critical location for the reduction of friction is between the sorption and desorption zones 10 and 20. The inventor has found that a simple air lock 36 between the adjacent aqueous sorption and desorption zones 10 and 20 will separate these liquids, at the same time allowing passage of strands 42 at reasonable speeds. Furthermore, such an air lock eliminates the sliding friction of strands 42 moving over the guides and the friction generated by the strands rubbing against each other as found in the prior art.

Air lock 36 is composed of a chamber between the sorption and desorption zones 10 and 20, with aligned apertures 62 and 64 in end plates 30 and 32, respectively. Apertures 62 and 64 are sufficiently larger than the strand diameter to allow passage of strand 42 through the holes without the strands touching the sides of the holes. However, the hole size must not be larger than necessary, since liquid is kept out of the air space by the liquid surface tension and the overpressure in air lock 36. In general, a water head of about one inch can be supported by holes of drill size 58 or smaller. More than a one inch head between holes will result in air escaping from the upper hole before it displaces enough water from air lock 36 to uncover the lower hole. With a minimum between strand spacing of about one centimeter, as suggested by boundary layer determinations such as those of Sakiadis (AIChE J 1961, page 467), two horizontal layers of strands would be the preferred maximum to be passed through a single constant pressure air lock, under the parameters described above. Additional, independently pressurized air locks could be utilized for greater numbers of strand layers, each air lock thereby capable of fine adjustment to the conditions present therein. Of course, different solutions of liquid in the sorption and desorption zones will affect the number of permissible strand layers per air lock.

In order to initiate the process, the sorption zone 10, desorption zone 20 and air lock 36 are filled with liquid. The air lock is then pressurized such that liquid is forced from air lock 36. The appropriate fluid mixtures are then fed to the sorption and desorption zones 10 and 20, via fluid inlets 14 and 24, respectively.

As seen in FIGS. 2 and 3, a strand 42 passes through sorption zone 10 and adsorbs a component of liquid 58. As the strand 42 passes through an aperture 62 into air lock 36, the surface tension of liquid 58 and the pressurization in air lock 36 causes fluid 58 to form a surface 70 within apertures 62. The liquid 58 is thereby maintained within sorption zone 10. After leaving sorption zone 10, strand 42 carries an adsorbed coating 68 of one component of fluid mixture 58. After passing through air lock 36 the strand passes through apertures 64 in plate 32 into desorption zone 20, wherein the adsorbed component on strand 42 is desorbed.

In devices where a distance from guide pulleys 46 and 48 to the air lock is of great length, strand guides 72 and 74 may be inserted adjacent the air lock so as to assure proper alignment of the strand within the holes of plates 30 and 32. Guides 72 and 74 may themselves be apertured plates similar to plates 30 and 32.

It should be noted that although the term air lock is utilized herein, it is expected that any specific gases other than air may be used where necessary for the particular processes involved. Nitrogen, for example, would be an appropriate lock filling gas where a non-oxidizing environment is required.

It can therefore be seen that a novel sorptive contactor and process has been described which achieves greater external sorptive surface than possible under the constraints of the moving boundary concept. Furthermore, strand friction is dramatically reduced over devices which separate and then rejoin a cable of strands, especially in the area between the sorption and desorption zones. This in turn increases the efficiency of the device. It can therefore be seen that the invention accomplishes at least all of its above-stated objectives.

I claim:

1. A process for adsorbing a component of a first liquid mixture and desorbing the component into a second liquid mixture, comprising the steps of:
   (a) Providing a sorption zone and desorption zone;
   (b) Providing at least one elongated sorptive strand means;
   (c) Providing at least one air lock between said sorption and desorption zones,
   (d) Causing a first liquid mixture to flow through said sorption zone;
   (e) Causing a second liquid mixture to flow through said desorption zone;
   (f) Causing said air lock to be pressurized with a gas;
   (g) Passing said strand means through said sorption zone, thence through said air lock, and then through said desorption zone; and
   (h) Creating conditions in said desorption zone such that the sorbed component will be desorbed.

2. The process of claim 1, wherein said strand means comprises a plurality of separated strands;

3. The process of claim 2 wherein said separated strands are a single strand spiraled into multiple generally parallel loops.

4. The process of claim 1, wherein said strand means is an endless loop and returns from said desorption zone to said sorption zone.

5. The process of claim 1, wherein said strand means is passed through an aperture in a first plate which forms a boundary between said sorption zone and air lock.

6. The process of claim 5, wherein said strand means is passed through an aperture in a second plate aligned with the aperture on the first plate, the second plate forming a boundary between said desorption zone and said air lock.

7. A contactor apparatus for adsorbing a component of a first liquid fluid mixture and for desorbing the adsorbed component into a second liquid, comprising:
   a sorption zone;
   a desorption zone positioned horizontally adjacent said sorption zone;
   airlock means separating said sorption and desorption zones;
   an elongated strand means of sorptive material extending through said sorption zone, air lock, and said desorption zone;
   means for pressurizing said air lock with a gas and wherein said air lock includes plate means having an aperture therethrough for each said strand means, each aperture being larger than the diameter of the strand means, but small enough to hold said liquids when said air lock is pressurized;
   means for moving said strand means through said sorption zone, air lock means and desorption zone;
   means for passing a liquid fluid mixture having a component to be adsorbed, through said sorption zone;
   means for passing a liquid fluid for desorbing the adsorbed component of the sorption zone fluid, through said desorption zone.

8. The apparatus of claim 7, including a boundary between said sorption zone and said air lock that comprises a first plate means having an aperture therethrough for each said strand means, each aperture being larger than the diameter of the strand means, but small enough to hold said liquid fluid mixture in said sorption zone when said air lock is pressurized.

9. The apparatus of claim 8, including a boundary between said air lock means and said desorption zone comprises a second plate means having an aperture therethrough for each strand means aligned with the apertures of said first plate means, each said aperture being larger than the diameter of the strand means but small enough to hold said liquid fluid in said desorption zone when said air lock is pressurized.

10. The apparatus of claim 8 wherein the spacing of the apertures in said first plate and second plate means is close enough to maintain fluid within the sorption and desorption zones while said strand means are moving therethrough and while said air lock is pressurized.

11. The apparatus of claim 7, wherein said strand means is a continuous loop and returns from said desorption zone to said sorption zone.

12. The apparatus of claim 11, wherein said strand means is spiraled so as to form multiple generally parallel loops.

13. The apparatus of claim 11, wherein said strand means includes a plurality of elongated separated strands.

14. The apparatus of claim 13 wherein said separated strands are generally parallel and spaced apart as they move from said sorption zone into said air lock and into said desorption zone.

15. The apparatus of claim 11 wherein said strand means is moved in a continuous loop by a drive pulley means and a plurality of idler pulley means.

16. The apparatus of claim 15 wherein said drive pulley means and said idler pulley means include soft rollers adapted to eliminate slippage of said strand means on said rollers.

17. The apparatus of claim 7, further comprising a first open port means in the upper end of said sorption zone, and a second open port means in the upper end of desorption zone, said port means permitting ingress of said strand means to said sorption zone and egress of said strand means from said desorption zone; and wherein said sorption zone fluid mixture and said desorption zone fluid mixture are maintained in their respective zones by gravity.

* * * * *